United States Patent
Attias et al.

(10) Patent No.: US 6,931,374 B2
(45) Date of Patent: Aug. 16, 2005

(54) METHOD OF SPEECH RECOGNITION USING VARIATIONAL INFERENCE WITH SWITCHING STATE SPACE MODELS

(75) Inventors: Hagai Attias, Seattle, WA (US); Leo Jingyu Lee, Waterloo (CA); Li Deng, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 118 days.

(21) Appl. No.: 10/405,166

(22) Filed: Apr. 1, 2003

(65) Prior Publication Data

US 2004/0199386 A1 Oct. 7, 2004

(51) Int. Cl.⁷ ............................................... G10L 15/12
(52) U.S. Cl. ...................... 704/240; 704/256; 704/252; 704/232
(58) Field of Search ............................ 700/29; 704/240, 704/232, 223, 256, 252, 255

(56) References Cited

U.S. PATENT DOCUMENTS

| | | | | |
|---|---|---|---|---|
| 5,317,673 A | * | 5/1994 | Cohen et al. ............... | 704/232 |
| 5,692,097 A | * | 11/1997 | Yamada et al. ............. | 704/240 |
| 5,799,272 A | * | 8/1998 | Zhu ........................... | 704/223 |
| 5,924,066 A | * | 7/1999 | Kundu ....................... | 704/256 |
| 6,591,146 B1 | * | 7/2003 | Pavlovic et al. ............... | 700/29 |
| 6,678,658 B1 | * | 1/2004 | Hogden et al. ............. | 704/240 |
| 2003/0187642 A1 | * | 10/2003 | Ponceleon et al. .......... | 704/252 |

OTHER PUBLICATIONS

Merhav et al ("Maximum Likelihood Hidden Markov Modeling Using A Dominant Sequence Of States", IEEE Transactions on Signal Processing, Sep. 1991).*

Merhav et al ("Hidden Markov Modeling Using The Most Likely State Sequence", International Conference on Acoustics, Speech, and Signal Processing, Apr. 1991).*

(Continued)

*Primary Examiner*—Vijay Chawan
(74) *Attorney, Agent, or Firm*—Theodore M. Magee; Westman, Champlin & Kelly, P.A.

(57) ABSTRACT

A method is developed which includes 1) defining a switching state space model for a continuous valued hidden production-related parameter and the observed speech acoustics, and 2) approximating a posterior probability that provides the likelihood of a sequence of the hidden production-related parameters and a sequence of speech units based on a sequence of observed input values. In approximating the posterior probability, the boundaries of the speech units are not fixed but are optimally determined. Under one embodiment, a mixture of Gaussian approximation is used. In another embodiment, an HMM posterior approximation is used.

26 Claims, 3 Drawing Sheets

OTHER PUBLICATIONS

Bourlard et al ("A Training Algorithm For Statistical Sequence Recognition With Applications To Transition-Based Speech Recognition", IEEE Signal Processing Letters, Jul. 1996).*

Zhou et al (Coarticulation Modeling by Embedding a Target-Directed Hidden Trajectory Model into HMM—Model and Training Microsoft Research Paper http://research.microsoft.com/srg/papers/2003-zhou-icassp.pdf, Jan. 2003).*

L. Deng, "A Dynamic, Feature-Based Approach to the Interface Between Phonology and Phonetics for Speech Modeling and Recognition," Speech Communication, vol. 24, No. 4, pp. 299-323 (1998).

L. Deng and Z. Ma, "Spontaneous Speech Recognition Using A Statistical Coarticulatory Model for the Hidden Vocal-Tract-Resonance Dynamics," J. Acoust. Soc. Am., vol. 108, No. 6, pp. 3036-3048 (2000).

L. Deng and J. Ma, "A Statistical Coarticulatory Model for the Hidden Vocal-Tract-Resonance Dynamics," Proc. of Eurospeech, vol. 4, pp. 1499-1502 (Sep. 1999).

L. Deng and H. Sameti, "Transitional Speech Units and Their Representation by the Regressive Markov States: Applications to Speech Recognition," IEEE Trans. Speech Audio Proc., vol. 4, No. 4, pp. 301-306 (Jul. 1996).

L. Deng and D. Sun, "A Statistical Approach to Automatic Speech Recognition Using the Atomic Speech Units Constructed from Overlapping Articulatory Features," J. Acoust. Soc. Am., vol. 95, pp. 2702-2719 (1994).

Y. Gao et al., "Multistage Coarticulation Model Combining Articulatory, Formant and Cepstral Features," Poc. ICSLP. vol. 1, pp. 25-28 (2000).

J. Ma and L. Deng, "A Path-Stack Algorithm for Optimizing Dymanic Regimes in a Statistical Hidden Dynamic Model of Speech," Computer Speech and Language, vol. 14, pp. 101-104 (2000).

M. Ostendorf et al., "From HMMs to Segment Models: A Unified View of Stochastic Modeling for Speech Recognition," IEEE Trans. Speech Audio Proc., vol. 4, pp. 360-378 (1996).

J. Ma and J. Deng, "Target-Directed Mixture Linear Dynamic Models for Spontaneous Speech Recognition," IEEE Trans. Speech and Audio Processing (submitted 1999, to appear 2002).

J. Bridle et al., "An Investigation of Segmental Hidden Dynamic Models of Speech Coarticulation for ASR," http://www.clsp.jhu.edu/ws98/projects/dynamic/presentations/finalhtml/index.html, Johns Hopkins Univ. 1998).

F.-L. Chen et al., "The Structure and Its Implementation of Hidden Dynamic HMM for Mandarin Speech Recognition," Proc. ICSLP, pp. 713-716, Denver (2002).

* cited by examiner

METHOD OF SPEECH RECOGNITION USING VARIATIONAL INFERENCE WITH SWITCHING STATE SPACE MODELS

BACKGROUND OF THE INVENTION

The present invention relates to pattern recognition. In particular, the present invention relates to speech recognition.

A pattern recognition system, such as a speech recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

Many speech recognition systems utilize Hidden Markov Models in which phonetic units, which are also referred to as acoustic units or speech units, are represented by a single tier of connected states. Using a training signal, probability distributions for occupying the states and for transitioning between states are determined for each of the phonetic units. To decode a speech signal, the signal is divided into frames and each frame is transformed into a feature vector. The feature vectors are then compared to the distributions for the states to identify a most likely sequence of HMM states that can be represented by the frames. The phonetic unit that corresponds to that sequence is then selected.

Although HMM-based recognition systems perform well in many relatively simple speech recognition tasks, they do not model some important dynamic aspects of speech directly (and are known to perform poorly for difficult tasks such as conversational speech). As a result, they are not able to accommodate dynamic articulation differences between the speech signals used for training and the speech signal being decoded.

For example, in casual speaking settings, speakers tend to hypo-articulate, or under articulate their speech. This means that the recursively defined trajectory of the user's speech articulation may not reach its intended target before it is redirected to a next target. Because the training signals are typically formed using a "reading" style of speech in which the speaker provides more fully articulated speech material than in hypo-articulated speech, the hypo-articulated speech does not match the trained HMM states. As a result, the recognizer provides less than ideal recognition results for casual speech.

A similar problem occurs with hyper-articulated speech. In hyper-articulated speech, the speaker exerts an extra effort to make the different sounds of their speech distinguishable. This extra effort can include changing the sounds of certain phonetic units so that they are more distinguishable from similar sounding phonetic units, holding the sounds of certain phonetic units longer, or transitioning between sounds more abruptly so that each sound is perceived as being distinct from its neighbors. Each of these mechanisms makes it more difficult to recognize the speech using an HMM system because each technique results in a set of feature vectors for the speech signal that often do not match well to the feature vectors present in the training data.

Even if the feature vectors corresponding to the hyper- or hypo-articulated speech match those in the training data (which may be very expensive to obtain), the conventional HMM technique will still perform poorly because of the increased phonetic confusability for the HMM system that does not take into account the underlying causes of the changes in the feature vector trajectories induced by hyper- or hypo-articulation. This problem is addressed specifically by the current invention.

HMM systems also have trouble dealing with changes in the rate at which people speak. Thus, if someone speaks slower or faster than the training signal, the HMM system will tend to make more errors decoding the speech signal.

Alternatives to HMM systems have been proposed. In particular, it has been proposed that the statistically defined trajectory or behavior of a production-related parameter of the speech signal should be modeled directly. Since the production-related values cannot be measured directly, these models are known as Hidden Dynamic Models (HDM). Hidden Dynamic Models are one example of a class of models known as switching state space models, which model the value of a parameter for a current frame based on the value of the parameter in one or more previous frames and one or more constants selected for the frame.

One problem with HDMs is that it is difficult to train them because common training algorithms, such as the Expectation-Maximization algorithm, become intractable for HDMs. This is due largely to the fact that in order to obtain the posterior probability for a sequence of hidden parameters given a sequence of input values, the probability for the combination of a hidden parameter and a possible speech unit must be summed over all possible sequences of speech units. This leads to a computation that increases exponentially with each additional frame of input values.

To overcome this problem, some systems of the prior art have assumed a fixed sequence of speech units during training. The boundaries between the speech units that define this sequence are set using HMM training before training the HDM. This is not theoretically optimal because the boundary parameters of the speech units are being fixed based on a different criteria than the other parameters in the hidden dynamic model.

Thus, a training system is needed that allows the boundaries to be trained with the other parameters of a hidden dynamic model while overcoming the intractability associated with such training.

SUMMARY OF THE INVENTION

A method includes defining a switching state space model of a hidden production-related parameter and approximating a posterior probability that provides the likelihood of a sequence of the hidden production-related parameters and a sequence of speech units based on a sequence of input values. In approximating the posterior probability, the boundaries of the speech units are not fixed. Under one embodiment, a mixture of Gaussian approximation is used. In another embodiment, an HMM posterior approximation is used.

DETAILED DESCRIPTION OF ILLUSTRATIVE EMBODIMENTS

Figure 1:
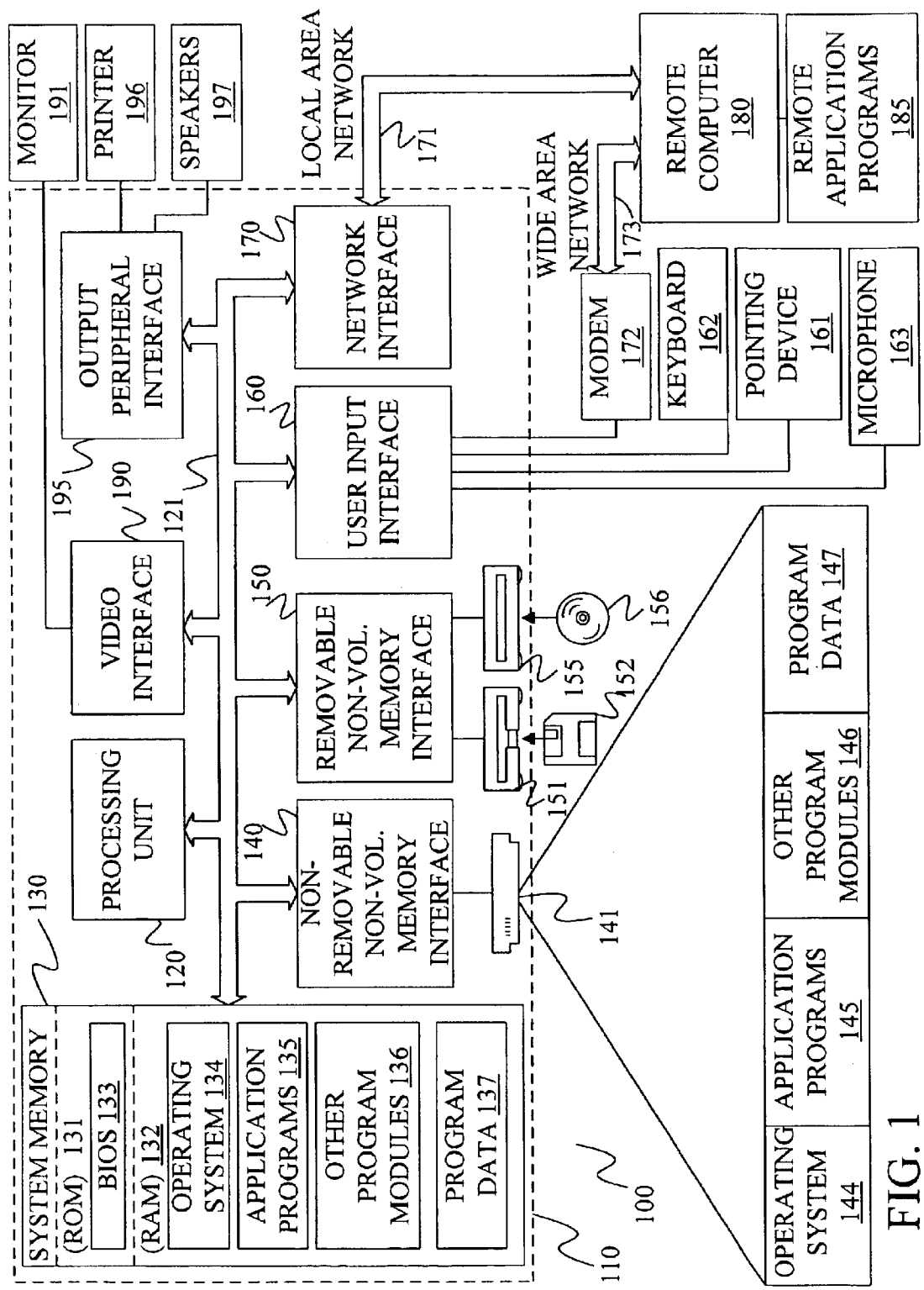
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
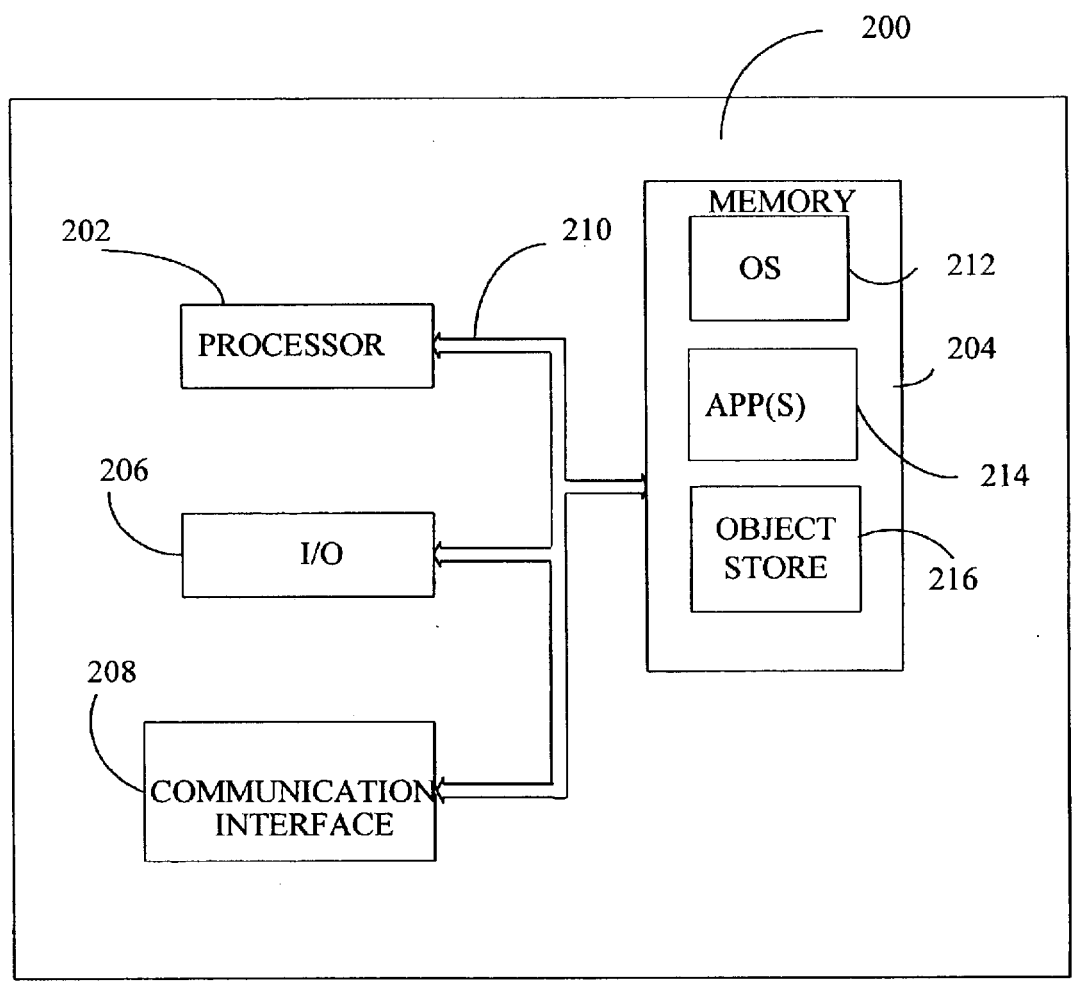
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

The present invention provides a generative model of speech. Under this model, speech is represented as the output of an attempt by the speaker to phonetically implement a linguistic definition of a sequence of speech units. During this attempt, the speaker produces a production-related value that follows a statistically defined trajectory (using the state-space formulation with recursive noise) toward a target associated with a current speech unit. Under embodiments of the present invention, this trajectory is modeled as a switching state-space model.

The model of the present invention is a special form of a Hidden Trajectory Model where the trajectory is defined recursively with noise added at each frame. This state-space model includes two layers, a dynamic or trajectory model component that describes hidden production-related parameters (such as vocal tract resonance frequencies), and a mapping model component that translates the production-related parameters into observable acoustic features such as Mel-Frequency Cepstral Coefficients. The state equation in the state-space model predicts a sequence of continuous state values $(x_1, \ldots, x_n, \ldots x_N)$ for a production-related parameter. The mapping model or the observation equation predicts a sequence of acoustic observation vectors $y_n$ given the sequence of continuous hidden state values.

The recursively defined trajectory and mapping models can be succinctly represented by the two equations:

$$x_n = A_s x_{n-1} + (I - A_s) u_s + w \qquad \text{Eq.1}$$

$$y_n = C_s x_n + c_s + v \qquad \text{Eq.2}$$

where n and s are frame number and speech unit index respectively, x is the hidden production-related parameter, y is the acoustic feature vector, $A_s$ and $C_s$ are speech-unit dependent system matrices, $u_s$ is a speech-unit dependent target, I is the identity matrix, $c_s$ is a speech-unit dependent constant, and w and v are noise terms.

Under one embodiment, the models of equations 1 and 2 are expressed in terms of probability distributions as:

$$p(s_n = s | s_{n-1} = s') = \pi_{ss'} \qquad \text{Eq.3}$$

$$p(x_n | s_n = s, x_{n-1}) = N(x_n | A_s x_{n-1} + a_s, B_s) \qquad \text{Eq.4}$$

$$p(y_n | s_n = s, x_n) = N(y_n | C_s x_n 30\ c_s, D_s) \qquad \text{Eq.5}$$

where $B_s$ and $D_s$ are precision matrices (the inverse of a covariance matrix), which are based on a variance associated with noise terms w and v and $a_s = (I - A_s) u_s$.

In general, training the model parameters of equations 3–5 requires an iterative two-step process. The first step is known as inference, during which a posterior distribution $p(s_{1:N}, x_{1:N}|y_{1:N})$ is calculated given an initial set of model parameters. During the second step, known as learning or parameter estimation, the model parameters are updated. These steps are repeated until the model parameters converge or some maximum number of iterations is reached. When performing generalized Expectation Maximization training, the E-step is the inference step and the M-step is the learning step.

The inference step cannot be performed directly for the models of Equations 3–5 because the posterior calculation is intractable. One embodiment of the present invention overcomes this problem by approximating the posterior distribution with a mixture of Gaussians model. Another embodiment of the invention overcomes this problem by approximating the posterior distribution using HMM posteriors. Using such approximations and a variational computation, it is possible to estimate the posterior probability. Each approximation is discussed separately below.

Mixture of Guassians

Under the mixture of Gaussians embodiment of the present invention, the posterior probability $p(s_{1:N}, x_{1:N}|y_{1:N})$ is approximated as $q(s_{1:N}, x_{1:N}|y_{1:N})$, which is defined as:

$$q(s_{1:N}, x_{1:N} | y_{1:N}) = \prod_{n=1:N} q(x_n | s_n, y_{1:N}) q(s_n | y_{1:N}) \quad \text{Eq. 6}$$

where q( ) represents a probability. Note that in the approximation of equation 6, the probability of a production-related value at frame n is not dependent on the value of the production-related parameters during other time frames and is only dependent on the value of the speech unit at frame n and not on the value of the speech unit for other frames. This greatly reduces the number of computations that must be made in order to calculate the approximation.

By minimizing a divergence between the approximation and the actual posterior distribution, the present inventors have found that the probability $q(x_n|s_n, y_{1:N})$ follows a Gaussian distribution:

$$q(x_n|s_n, y_{1:N}) = N(x_n|\rho_{s,n}, \Gamma_{s,n}) \quad \text{Eq. 7}$$

where the mean $\rho_{s,n}$ and the covariance $\Gamma_{s,n}$ are given by:

$$\Gamma_{s,n} = C_s^T D_s C_s + B_s + \sum_{s'} \gamma_{s',n+1} A_{s'}^T B_{s'} A_{s'} \quad \text{Eq. 8}$$

$$\Gamma_{s,n}\rho_{s,n} = B_s\left(A_s \sum_{s'} \gamma_{s',n-1}\rho_{s',n-1} + a_s\right) + \quad \text{Eq. 9}$$

$$\sum_{s'} \gamma_{s',n+1} A_{s'}^T B_{s'}(\rho_{s',n+1} - a_{s'}) +$$

$$C_s^T D_s (y_n - c_s)$$

where $\gamma_{s,n} = q(s_n = s|y_{1:N})$ is the probability of a speech unit at frame n and is computed as:

$$\log \gamma_{s,n} = f_1 + f_2 + f_3 \quad \text{Eq. 10}$$

where:

$$f_1 = \frac{1}{2}\left\{\log\left|\frac{D_s}{2\pi}\right| - \log\left|\frac{\Gamma_{s,n}}{2\pi}\right| - <C_s^T D_s C_s, \Gamma_{s,n}^{-1} + \rho_{s,n}\rho_{s,n}^T> - \quad \text{Eq. 11}\right.$$

$$2(c_s - y_n)^T D_s C_s \rho_{s,n} - (c_s - y_n)^T D_s (c_s - y_n) +$$

-continued $$<\Gamma_{s,n}, \Gamma_{s,n}^{-1} + \rho_{s,n}\rho_{s,n}^T> - \rho_{s,n}^T \Gamma_{s,n}\rho_{s,n}$$

$$\log\left|\frac{B_s}{2\pi}\right| - <B_s, \Gamma_{s,n}^{-1} + \rho_{s,n}\rho_{s,n}^T> + 2a_s^T B_s \rho_{s,n} - a_s^T B_s a_s\Big\}$$

$$f_2 = \frac{1}{2}\sum_{s'} \gamma_{s',n-1}\{-<A_s^T B_s A_s, \Gamma_{s',n-1}^{-1} + \rho_{s',n-1}\rho_{s',n-1}^T> - \quad \text{Eq. 12}$$

$$2(a_s - \rho_{s,n})^T B_{s'} A_{s'} \rho_{s',n-1} + 2\log \pi_{s's}\}$$

$$f_3 = \frac{1}{2}\sum_{s'} \gamma_{s',n+1}\left\{\log\left|\frac{B_{s'}}{2\pi}\right| - <A_{s'}^T B_{s'} A_{s'}, \Gamma_{s,n}^{-1} + \rho_{s,n}\rho_{s,n}^T> - \quad \text{Eq. 13}\right.$$

$$2(a_{s'} - \rho_{s',n+1})^T B_{s'} A_{s'} \rho_{s',n} - <B_{s'}, \Gamma_{s',n+1}^{-1} +$$

$$\rho_{s',n+1}\rho_{s',n+1}^T> - 2a_{s'}^T B_{s'} \rho_{s',n+1} - a_{s'}^T B_{s'} a_{s'} + 2\log \pi_{s's}\}$$

where <> denotes a scalar obtained by summing up the element-wise product of two equal-sized vectors or matrices, and s' is an index for speech units for the summations. In the practice of this invention, the summation terms indicated by s' variable (discrete state) in the above equation have been drastically reduced during the training phase since the training script is available that strongly constrains the possible s sequence.

Under one embodiment, the inference step is performed by first determining $\gamma_{s,n}$ for each s,n combination using Equation 10 and previous values of $\rho_{s,n}$ and $\Gamma_{s,n}$. Since the computation of $\gamma_{s,n}$ in Equation 10 is dependent on $\gamma_{s,n}$, Equation 10 is evaluated iteratively until $\gamma_{s,n}$ converges. Equation 8 is then evaluated using the new value of $\gamma_{s,n}$ from equation 10 to produce an updated value of $\Gamma_{s,n}$. The updated value of $\Gamma_{s,n}$ is then used with $\gamma_{s,n}$ to determine $\rho_{s,n}$ in Equation 9. Note that Equations 8 and 9 are coupled linear equations and can be solved efficiently by sparse matrix techniques. This process can be repeated iteratively to improve the accuracy of the values for $\gamma_{s,n}$, $\Gamma_{s,n}$, and $\rho_{s,n}$.

After the inference step is complete, the values for $\gamma_{s,n}$, $\Gamma_{s,n}$, and $\rho_{s,n}$ are used in the learning step to set the values of model parameters $\Theta = \{A_{1:S}, a_{1:S}, B_{1:S}, C_{1:S}, c_{1:S}, D_{1:S}\}$ according to:

$$A_s = \left[\frac{1}{\sum_n \gamma_{s,n}}\left(\sum_n \gamma_{s,n}\rho_{s,n}\right)\left(\sum_n \gamma_{s,n}\sum_{s'} \gamma_{s',n-1}\rho_{s',n-1}\right)^T - \quad \text{Eq. 14}\right.$$

$$\sum_n \gamma_{s',n}\rho_{s,n}\sum_{s'} \gamma_{s',n-1}\rho_{s',n-1}^T\Bigg]$$

$$\left[\frac{1}{\sum_n \gamma_{s,n}}\left(\sum_n \gamma_{s,n}\sum_{s'} \gamma_{s',n-1}\rho_{s',n-1}\right)\right.$$

$$\left(\sum_n \gamma_{s,n}\sum_{s'} \gamma_{s',n-1}\rho_{s',n-1}\right)^T -$$

$$\left.\sum_n \gamma_{s,n}\sum_{s'} \gamma_{s',n-1}(\Gamma_{s',n-1}^{-1} + \rho_{s',n-1}\rho_{s',n-1}^T)\right]^{-1}$$

$$a_s = \frac{1}{\sum_n \gamma_{s,n}}\left(\sum_n \gamma_{s,n}\rho_{s,n} - A_s\sum_n \gamma_{s,n}\sum_{s'} \gamma_{s',n-1}\rho_{s',n-1}\right) \quad \text{Eq. 15}$$

$$B_s^{-1} = \frac{1}{\sum_n \gamma_{s,n}}\left\{\sum_n \gamma_{s,n}(\Gamma_{s,n}^{-1} + \rho_{s,n}\rho_{s,n}^T) - \quad \text{Eq. 16}\right.$$

-continued $$\left[\sum_n \gamma_{s,n}\rho_{s,n}\left(\sum_{s'}\gamma_{s',n-1}\rho_{s',n-1}\right)^T\right]A_s^T -$$

$$\left(\sum_n \gamma_{s,n}\rho_{s,n}\right)a_s^T\right\} -$$

$$A_s\left[\sum_n \gamma_{s,n}\left(\sum_{s'}\gamma_{s',n-1}\rho_{s',n-1}\right)\rho_{s,n}^T\right] +$$

$$A_s\left[\sum_n \gamma_{s,n}\sum_{s'}\gamma_{s',n-1}(\Gamma_{s',n-1}^{-1} + \rho_{s',n-1}\rho_{s',n-1}^T)\right]A_s^T +$$

$$A_s\left(\sum_n \gamma_{s,n}\sum_{s'}\gamma_{s',n-1}\rho_{s',n-1}\right)a_s^T - a_s\left(\sum_n \gamma_{s,n}\rho_{s,n}\right)^T +$$

$$a_s\left[\sum_n \gamma_{s,n}\left(\sum_{s'}\gamma_{s',n-1}\rho_{s',n-1}\right)^T\right]A_s^T + a_s a_s^T$$

$$C_s = \left[\frac{1}{\sum_n \gamma_{s,n}}\left(\sum_n \gamma_{s,n}y_n\right)\left(\sum_n \gamma_{s,n}\rho_{s,n}\right)^T - \sum_n \gamma_{s,n}y_n\rho_{s,n}^T\right] \quad \text{Eq. 17}$$

$$\left[\frac{1}{\sum_n \gamma_{s,n}}\left(\sum_n \gamma_{s,n}\rho_n\right)\left(\sum_n \gamma_{s,n}\rho_{s,n}\right)^T - \sum_n \gamma_{s,n}(\Gamma_{s,n}^{-1} + \rho_{s,n}\rho_{s,n}^T)\right]^{-1}$$

$$c_s = \frac{1}{\sum_n \gamma_{s,n}}\left(\sum_n \gamma_{s,n}y_n - C_s\sum_n \gamma_{s,n}\rho_{s,n}\right) \quad \text{Eq. 18}$$

$$D_s^{-1} = \frac{1}{\sum_n \gamma_{s,n}}\left\{\sum_n \gamma_{s,n}y_n y_n^T - \left(\sum_n \gamma_{s,n}y_n\rho_{s,n}^T\right)C_s^T - \right. \quad \text{Eq. 19}$$

$$\left(\sum_n \gamma_{s,n}y_n\right)c_s^T - C_s\left(\sum_n \gamma_{s,n}y_n\rho_{s,n}^T\right)^T +$$

$$C_s\left[\sum_n \gamma_{s,n}(\Gamma_{s,n}^{-1} + \rho_{s,n}\rho_{s,n}^T)\right]C_s^T + C_s\left(\sum_n \gamma_{s,n}\rho_{s,n}\right)c_s^T -$$

$$c_s\left(\sum_n \gamma_{s,n}y_n\right)^T + c_s\left(\sum_n \gamma_{s,n}\rho_{s,n}\right)^T C_s^T\right\} + c_s c_s^T$$

The inference and learning steps may be iterated several times to complete the training.

HMM Posterior

In a second embodiment, the posterior is approximated using an HMM posterior defined as:

$$q(s_{1:N}, x_{1:N} | y_{1:N}) = \prod_{n=1}^{N} q(x_n | s_n, y_{1:N}) \cdot \prod_{n=2}^{N} q(s_n | s_{n-1}, y_{1:N}) \cdot q(s_1 | y_{1:N}) \quad \text{Eq. 20}$$

As in the mixture of Gaussian model, the probability $q(x_n|s_n,y_{1:N})$ in the HMM Posterior model is a Gaussian distribution with a mean $\rho_{s,n}$ and a covariance matrix $\Gamma_{s,n}$. The mean $\rho_{s,n}$ and the covariance matrix $\Gamma_{s,n}$ are calculated using equations 8 and 9 above with a new definition of $\gamma_{s,n}$. In particular, $\gamma_{s,n}$ is determined using a backward-forward process that also defines a posterior transition probability $\eta_{s's,n} = q(s_n=s|s_{n-1}=s',y_{1:N})$.

The backward-forward process begins by initializing a value $z_{s,N+1}=1$ for all s. During the backward pass, the following calculations are performed for n=N, ... ,2:

$$z_{s,n} = \sum_{s'} \exp(f_{ss',n})z_{s',n+1} \quad \text{Eq. 21}$$

$$\eta_{ss',n} = \frac{1}{z_{s,n}}\exp(f_{ss',n})z_{s',n+1} \quad \text{Eq. 22}$$

For n=1:

$$z_1 = \sum_s \exp(f_{s,1})z_{s,2} \quad \text{Eq. 23}$$

$$\gamma_{s,1} = \frac{1}{z_1}\exp(f_{s,1})z_{s,2} \quad \text{Eq. 24}$$

During the forward pass the following calculation is performed for n=2, ..., N:

$$\gamma_{s,n} = \sum_{s'} \eta_{s's,n}\gamma_{s',n-1} \quad \text{Eq. 25}$$

where:

$$f_{s's,n} = \frac{1}{2}\left\{\log\left|\frac{D_s}{2\pi}\right| - <C_s^T D_s C_s, \Gamma_{s,n}^{-1} + \rho_{s,n}\rho_{s,n}^T> - \right. \quad \text{Eq. 26}$$

$$2(c_s - y_n)^T D_s C_s \rho_{s,n} - (c_s - y_n)^T D_s (c_s - y_n) -$$

$$\log\left|\frac{\Gamma_{s,n}}{2\pi}\right| + <\Gamma_{s,n}, \Gamma_{s,n}^{-1} + \rho_{s,n}\rho_{s,n}^T> - \rho_{s,n}^T \Gamma_{s,n}\rho_{s,n} +$$

$$\log\left|\frac{B_s}{2\pi}\right| - <A_s^T B_s A_s, \Gamma_{s',n-1}^{-1} + \rho_{s',n-1}\rho_{s',n-1}^T> -$$

$$2(a_s - \rho_{s,n})^T B_s A_s \rho_{s',n-1} - <B_s, \Gamma_{s,n}^{-1} + \rho_{s,n}\rho_{s,n}^T> +$$

$$\left. 2a_s^T B_s \rho_{s,n} - a_s^T B_s a_s + 2\log \pi_{s's}\right\}$$

$$f_{s,1} = \frac{1}{2}\left\{\log\left|\frac{D_s}{2\pi}\right| - <C_s^T D_s C_s, \Gamma_{s,1}^{-1} + \rho_{s,1}\rho_{s,1}^T> - \right. \quad \text{Eq. 27}$$

$$2(c_s - y_1)^T D_s C_s \rho_{s,1} - (c_s - y_1)^T D_s (c_s - y_1) -$$

$$\log\left|\frac{\Gamma_{s,1}}{2\pi}\right| + <\Gamma_{s,1}, \Gamma_{s,1}^{-1} + \rho_{s,1}\rho_{s,1}^T> - \rho_{s,1}^T \Gamma_{s,1}\rho_{s,1} +$$

$$\log\left|\frac{B_s}{2\pi}\right| - <B_s, \Gamma_{s,1}^{-1} + \rho_{s,1}\rho_{s,1}^T> +$$

$$\left. 2 a_s^T B_s \rho_{s,1} - a_s^T B_s a_s + 2\log \pi_0\right\}$$

Thus, during the inference step, $\gamma_{s,n}$ is calculated first using the backward-forward process of equations 21–27. The mean $\rho_{s,n}$ and covariance $\Gamma_{s,n}$ are then calculated using equations 8 and 9 above and the calculated $\gamma_{s,n}$. These steps can be iterated before performing the learning step so that the values of $\gamma_{s,n}$, $\rho_{s,n}$, and $\Gamma_{s,n}$ reach stable values.

After the inference step is complete, the learning step can be performed to set the values of model parameters $\Theta=\{A_{1:S},a_{1:S},B_{1:S},C_{1:S},c_{1:S},D_{1:S}\}$ using the following equations:

$$A_s = \left[\frac{1}{\sum_n \gamma_{s,n}}\left(\sum_n \gamma_{s,n}\rho_{s,n}\right)\left(\sum_n \sum_{s'}\eta_{s's,n}\gamma_{s',n-1}\rho_{s',n-1}\right)^T - \right. \quad \text{Eq. 28}$$

-continued $$\sum_n \rho_{s,n} \sum_{s'} \eta_{s',n} \gamma_{s',n-1} \rho_{s',n-1}^T \Bigg]$$

$$\left[\frac{1}{\sum_n \gamma_{s,n}} \left( \sum_n \sum_{s'} \eta_{s',n} \gamma_{s',n-1} \rho_{s',n-1} \right) \right.$$

$$\left( \sum_n \sum_{s'} \eta_{s',n} \gamma_{s',n-1} \rho_{s',n-1} \right)^T -$$

$$\left. \sum_n \sum_{s'} \eta_{s',n} \gamma_{s',n-1} (\Gamma_{s',n-1}^T + \rho_{s',n-1} \rho_{s',n-1}^T) \right]^{-1}$$

$$a_s = \frac{1}{\sum_n \gamma_{s,n}} \left( \sum_n \gamma_{s,n} \rho_{s,n} - A_s \sum_n \sum_{s'} \eta_{s',n} \gamma_{s',n-1} \rho_{s',n-1} \right) \quad \text{Eq. 29}$$

$$NB_s^{-1} = \sum_n \gamma_{s,n} (\Gamma_{s,n}^{-1} + \rho_{s,n} \rho_{s,n}^T) - \quad \text{Eq. 30}$$

$$\left[ \sum_n \rho_{s,n} \left( \sum_{s'} \eta_{s',n} \gamma_{s',n-1} \rho_{s',n-1}^T \right) \right] A_s^T -$$

$$\left( \sum_n \gamma_{s,n} \rho_{s,n} \right) a_s^T -$$

$$A_s \left[ \sum_n \left( \sum_{s'} \eta_{s',n} \gamma_{s',n-1} \rho_{s',n-1} \right) \rho_{s,n}^T \right] +$$

$$A_s \left[ \sum_n \sum_{s'} \eta_{s',n} \gamma_{s',n-1} (\Gamma_{s',n-1} + \rho_{s',n-1} \rho_{s',n-1}^T) \right] A_s^T +$$

$$A_s \left( \sum_n \sum_{s'} \eta_{s',n} \gamma_{s',n-1} \rho_{s',n-1} \right) a_s^T - a_s \sum_n \gamma_{s,n} \rho_{s,n}^T +$$

$$a_s \left( \sum_n \sum_{s'} \eta_{s',n} \gamma_{s,n-1} - 1 \rho_{s',n-1} \right)^T A_s^T +$$

$$\left( \sum_n \gamma_{s,n} \right) a_s a_s^T$$

$$C_s = \left[ \frac{1}{\sum_n \gamma_{s,n}} \left( \sum_n \gamma_{s,n} y_n \right) \left( \sum_n \gamma_{s,n} \rho_{s,n} \right)^T - \sum_n \gamma_{s,n} y_n \rho_{s,n}^T \right] \quad \text{Eq. 31}$$

$$\left[ \frac{1}{\sum_n \gamma_{s,n}} \left( \sum_n \gamma_{s,n} \rho_n \right) \left( \sum_n \gamma_{s,n} \rho_{s,n} \right)^T - \right.$$

$$\left. \sum_n \gamma_{s,n} (\Gamma_{s',n-1}^T + \rho_{s',n-1} \rho_{s',n-1}^T) \right]^{-1}$$

$$c_s = \frac{1}{\sum_n \gamma_{s,n}} \left( \sum_n \gamma_{s,n} y_n - C_s \sum_n \gamma_{s,n} \rho_{s,n} \right) \quad \text{Eq. 32}$$

$$ND_s^{-1} = \sum_n \gamma_{s,n} y_n y_n^T - \left( \sum_n \gamma_{s,n} y_n \rho_{s,n}^T \right) C_s^T - \quad \text{Eq. 33}$$

$$\left( \sum_n \gamma_{s,n} y_n \right) c_s^T - C_s \left( \sum_n \gamma_{s,n} y_n \rho_{s,n}^T \right)^T +$$

$$C_s \left[ \sum_n \gamma_{s,n} (\Gamma_{s,n}^{-1} + \rho_{s,n} \rho_{s,n}^T) \right] C_s^T +$$

$$C_s \left( \sum_n \gamma_{s,n} \rho_{s,n} \right) c_s^T - c_s \left( \sum_n \gamma_{s,n} y_n \right)^T +$$

$$c_s \left( \sum_n \gamma_{s,n} \rho_{s,n} \right)^T C_s^T + \left( \sum_n \gamma_{s,n} \right) c_s c_s^T$$

Training Refinements

As those skilled in the art will recognize, iterative local optimization training algorithms, such as those discussed above for the mixture of Gaussian and HMM posterior models, perform better if the initialization values for the model parameters are close to the values identified through training. Under some embodiments of the present invention, the target parameter, $a_s$, for the production-related parameter is set based on hand-labeled production-related values. In one particular embodiment where the production-related values are vocal track resonances (VTR), the targets are initialized based on hand-labeled VTR data acquired from a speaker.

Because the phone boundaries are not fixed under the approximations made above, phone transitions can occur at each frame. For natural speech, there is some minimum duration for each phone such that transitions should not be allowed at each frame. To address this, embodiments of the present invention utilize a series of time-varying transition matrices that provide probabilities for transitioning to other phones at each frame. The matrices are built by modifying speech unit boundaries identified by HMM training. The modification to the boundaries involves transforming each boundary from a hard fixed boundary that occurs between two frames to a probabilistic boundary that extends over a number of frames. In a hard fixed boundary the value of $\gamma_{s,n}$ for each speech unit is either 1, indicating 100 percent probability of the speech unit for the frame or 0, indicating zero probability of the speech unit for the frame. Under the modified boundaries, the value of $\gamma_{s,n}$ can be anything between 0 and 1.

For example, if the HMM predicts a fixed boundary between a speech unit $s_1$ and a speech unit $s_2$, under one embodiment, the probability of speech unit $s_1$ and speech unit $s_2$ will be set to 0.5 for the three frames before the fixed boundary and the three frames after the fixed boundary. In another embodiment, the probabilities of speech units $s_1$ and $s_2$ change gradually across the frames surrounding the fixed boundary. For example, the probability for speech unit $s_1$ across the respective frames would be [1, 0.8, 0.6, 0.5, 0.4, 0.2, 0] while the probability for speech unit $s_2$ across the same frames would be [0, 0.2, 0.4, 0.5, 0.6, 0.8, 1]. Note that speech units that are not predicted for a frame or a neighboring frame have a probability of zero.

Note that the number of frames on each side of the boundary can be different than three and can be based on the midpoint of each speech unit as set by the HMM training.

Hidden Production Parameter Recovery

As noted above, the production-related parameters that the models of the present invention are based on are hidden and cannot be measured directly. However, for judging the performance of the system and for collecting data on the hidden production-related parameters, such as the vocal resonance tracks, it is desirable to be able to recover the values of the hidden production-related parameters.

Under the present invention, this can be done easily once the values of $\gamma_{s,n}$ and $\rho_{s,n}$ have been trained using either the mixture of Gaussian approximation or the HMM posterior approximation described above. Once those values are known, the hidden production-related parameter is simply:

$$\hat{x}_n = \sum_s \gamma_{s,n} \rho_{s,n} \qquad \text{Eq. 34}$$

Speech Recognition

After the model parameters have been trained using one of the approximations discussed above, the model parameters and the approximations can be used to perform speech recognition. This involves identifying a most likely sequence of speech units, such as phones, given a sequence of observation feature vectors that represent a speech signal.

For the mixture of Gaussians approximation, speech recognition can be performed by simply determining $\gamma_{s,n}$, $\Gamma_{s,n}$, and $\rho_{s,n}$ based on the observation feature vectors and the trained model parameters $\Theta = \{A_{1:S}, a_{1:S}, B_{1:S}, C_{1:S}, c_{1:S}, D_{1:S}\}$. The speech unit s with the maximum $\gamma_{s,n}$ at frame n is then selected as the speech unit for frame n.

To avoid unnatural speech unit switching, this recognition system can be augmented with a transition matrix that adds a minimal duration constraint to the speech units. Thus, in the transition matrix, each transition between speech units has an associated probability, with the probability for remaining within a speech unit being higher than the probability of transitioning to another speech unit, at least for some minimum number of frames for each speech unit. In order to perform speech recognition using this transition matrix, a Viterbi decoder may be used that identifies the most likely path through the possible speech units given the transition probabilities and the $\gamma_{s,n}$ probabilities.

For the HMM posterior approximation, speech recognition is performed by determining $\gamma_{s,n}$, $\eta_{ss',n}$, $\Gamma_{s,n}$, and $\rho_{s,n}$ based on the observation feature vectors and the trained model parameters $\Theta = \{A_{1:S}, a_{1:S}, B_{1:S}, C_{1:S}, c_{1:S}, D_{1:S}\}$. The speech unit probabilities for the first frame, $\gamma_{s,n}$, and the transition probabilities, $\eta_{ss',n}$, are then used in Viterbi decoding to identify a most likely sequence of speech units s. In terms of equations, the Viterbi decoder finds a maximum path score $V_N$ according to:

$$V_1(s) = \gamma_{s,1} \qquad \text{Eq. 35}$$

$$V_n(s') = \max_{1 \le s \le S} [V_{n-1}(s)\eta_{ss',n}] \qquad \text{Eq. 36}$$

As with the mixture of Gaussian approximation, a duration constraint can be added to the HMM posterior decoding by modifying the transition probabilities to increase the likelihood of remaining within a speech unit relative to the likelihood of transitioning to other speech units.

Figure 3:
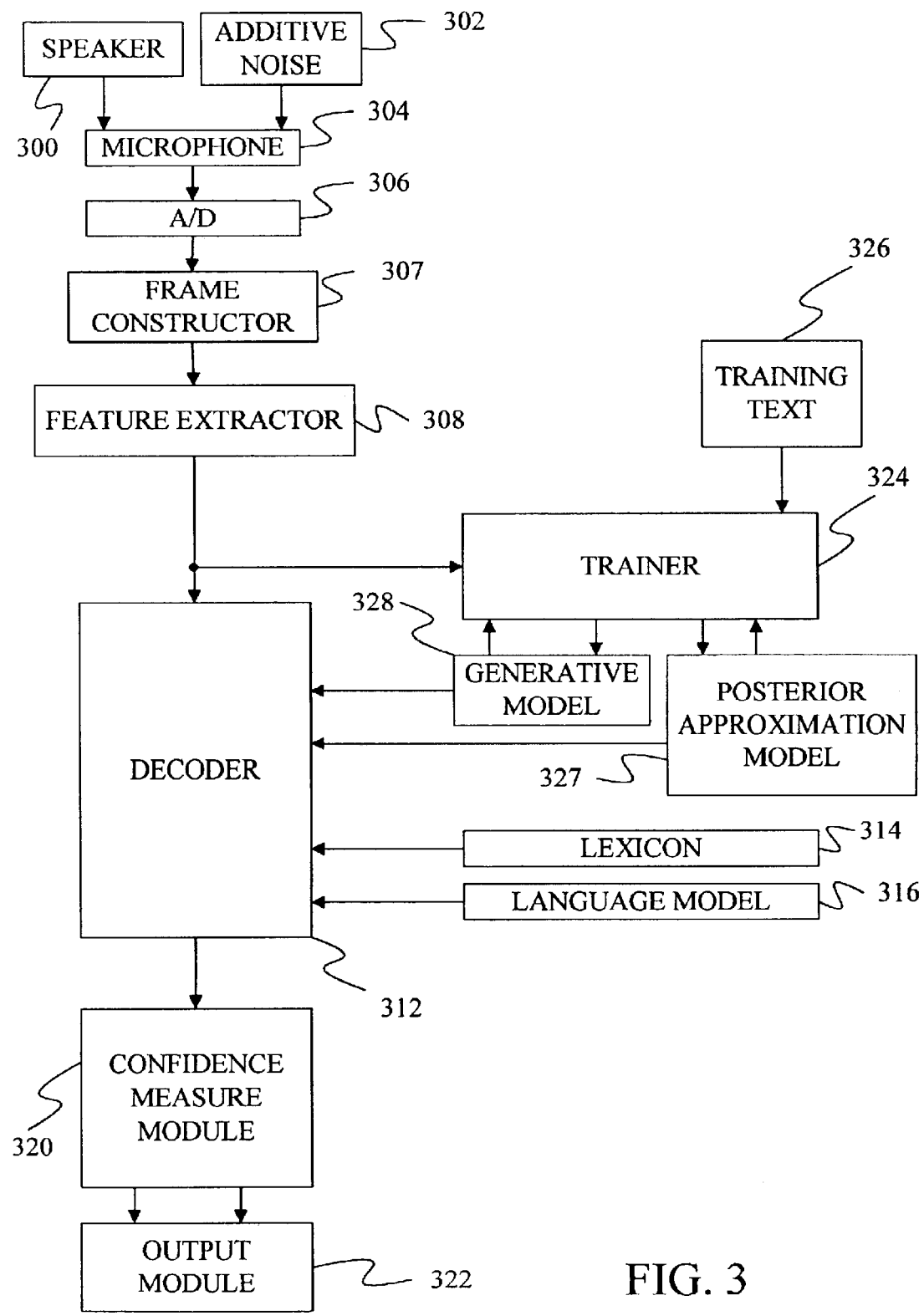
FIG. 3 is a block diagram of a speech recognition system under one embodiment of the present invention.

FIG. 3 provides a block diagram of a speech recognition system in which the present invention can be used. In FIG. 3, a speaker 300, either a trainer or a user, speaks into a microphone 304. Microphone 304 also receives additive noise from one or more noise sources 302. The audio signals detected by microphone 304 are converted into electrical signals that are provided to analog-to-digital converter 306.

A-to-D converter 306 converts the analog signal from microphone 304 into a series of digital values. In several embodiments, A-to-D converter 306 samples the analog signal at 16 kHz and 16 bits per sample, thereby creating 32 kilobytes of speech data per second. These digital values are provided to a frame constructor 307, which, in one embodiment, groups the values into 25 millisecond frames that start 10 milliseconds apart.

The frames of data created by frame constructor 307 are provided to feature extractor 308, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The series of feature vectors is provided to a trainer 324, which uses the feature vectors and a training text 326 to train a generative model 328 of the present invention, if the input signal is a training signal. For example, the EM training algorithm described above may be used to train the generative model parameters $\Theta = \{A_{1:S}, a_{1:S}, B_{1:S}, C_{1:S}, c_{1:S}, D_{1:S}\}$. As discussed above, in order to train generative model 328, trainer 324 trains an approximation model 327, such as the mixture of Gaussian approximation or the HMM posterior approximation discussed above.

As mentioned above, the EM training algorithm may be iterative. In such cases, trainer 324 accesses generative model 328 while training approximation model 327 and accesses approximation model 327 while training generative model 328.

Once generative model 328 has been trained, an input speech signal is converted into a stream of observation feature vectors. These feature vectors are provided to trainer 324, which sets the model parameters for approximation model 327 based on the observation vectors and the parameters of generative model 328. Decoder 312 then identifies a most likely sequence of words based on the stream of feature vectors, a lexicon 314, a language model 316, approximation model 327 and generative model 328. Under one embodiment, lexicon 314 defines a finite state network that is traversed by decoder 312 to identify a word from a sequence of feature vectors. Note that as discussed above, this network, referred to above as a transition matrix, may include duration constraints for the speech units that make up the words.

The most probable sequence of hypothesis words is provided to a confidence measure module 320. Confidence measure module 320 identifies which words are most likely to have been improperly identified by the speech recognizer, based in part on a secondary acoustic model(not shown). Confidence measure module 320 then provides the sequence of hypothesis words to an output module 322 along with identifiers indicating which words may have been improperly identified. Those skilled in the art will recognize that confidence measure module 320 is not necessary for the practice of the present invention.

Although the present invention has been described with reference to particular embodiments, workers skilled in the art will recognize that changes may be made in form and detail without departing from the spirit and scope of the invention.

What is claimed is:

1. A method of estimating a posterior probability for a switching state space model, the posterior probability providing the likelihood of a set of speech units and a set of hidden parameters for a sequence of frames based upon input values associated with the sequence of frames, the method comprising:

approximating the posterior probability in part by multiplying individual hidden parameter probabilities together to form a product of the hidden parameter probabilities, wherein each individual hidden parameter probability provides the probability of a hidden parameter for a frame given a speech unit of the frame and given the input values for the sequence of frames, and by multiplying the product of the hidden parameter probabilities by the product of speech unit probabilities, wherein each speech unit probability provides a probability of a speech unit for a frame; and adjusting parameters that define the hidden parameter probabilities so that the hidden parameter probabilities provide a better approximation of the posterior probability.

2. The method of claim 1 further comprising adjusting the speech unit probabilities so that the speech unit probabilities provide a better approximation of the posterior probability.

3. The method of claim 1 further comprising using the approximation of the posterior probability to decode input values to identify a sequence of speech units for the sequence of frames.

4. The method of claim 3 wherein using the approximation comprises selecting a speech unit for each frame by selecting the speech unit with the highest speech unit probability for the frame.

5. The method of claim 3 wherein using the approximation comprises applying a duration constraint to the speech units and selecting a best sequence of speech units based on the duration constraint and the speech unit probabilities.

6. The method of claim 1 wherein approximating the posterior probability further comprises multiplying the product of the hidden parameter probabilities by a product of speech unit transition probabilities, wherein each speech unit transition probability provides a probability of a speech unit in a frame given a speech unit in another frame.

7. The method of claim 6 further comprising adjusting the speech unit transition probabilities so that the speech unit transition probabilities provide a better approximation of the posterior probability.

8. The method of claim 6 further comprising using the approximation of the posterior probability to decode input values to identify a sequence of speech units for the sequence of frames.

9. The method of claim 8 wherein using the approximation comprises selecting a sequence of speech units based on the speech unit transition probabilities.

10. The method of claim 9 wherein using the approximation comprises applying a duration constraint to the speech units and selecting a best sequence of speech units based on the duration constraint and the speech unit transition probabilities.

11. The method of claim 1 wherein adjusting the parameters that define the hidden parameter probabilities comprises adjusting the parameters based on parameters of the switching state space model to produce adjusted parameters.

12. The method of claim 11 wherein the input values are generated from a training signal and wherein adjusting the parameters further comprises adjusting the parameters of the switching state space model based on adjusted parameters that define the hidden parameter probabilities to form adjusted switching state space model parameters and adjusting the adjusted parameters that define the hidden parameter probabilities based on the adjusted switching state space model parameters.

13. The method of claim 1 further comprising using the approximation of the posterior probability to identify a sequence of hidden parameters for the sequence of frames.

14. A method of estimating a posterior probability for a switching state space model, the posterior probability providing the likelihood of a set of speech units and a set of hidden parameters for a sequence of frames based upon input values associated with the sequence of frames, the method comprising:

approximating the posterior probability in part by multiplying individual hidden parameter probabilities together to form a product of the hidden parameter probabilities, wherein each individual hidden parameter probability provides the probability of a hidden parameter for a frame given a speech unit of the frame and given the input values for the sequence of frames, and by multiplying the product of the hidden parameter probabilities by a product of speech unit transition probabilities, wherein each speech unit transition probability provides a probability of a speech unit in a frame given a speech unit in another frame; and adjusting parameters that define the hidden parameter probabilities so that the hidden parameter probabilities provide a better approximation of the posterior probability.

15. The method of claim 14 wherein approximating the posterior probability further comprises multiplying the product of the hidden parameter probabilities by the product of speech unit probabilities, wherein each speech unit probability provides a probability of a speech unit for a frame.

16. The method of claim 15 further comprising adjusting the speech unit probabilities so that the speech unit probabilities provide a better approximation of the posterior probability.

17. The method of claim 15 further comprising using the approximation of the posterior probability to decode input values to identify a sequence of speech units for the sequence of frames.

18. The method of claim 17 wherein using the approximation comprises selecting a speech unit for each frame by selecting the speech unit with the highest speech unit probability for the frame.

19. The method of claim 17 using the approximation comprises applying a duration constraint to the speech units and selecting a best sequence of speech units based on the duration constraint and the speech unit probabilities.

20. The method of claim 14 further comprising adjusting the speech unit transition probabilities so that the speech unit transition probabilities provide a better approximation of the posterior probability.

21. The method of claim 14 further comprising using the approximation of the posterior probability to decode input values to identify a sequence of speech units for the sequence of frames.

22. The method of claim 21 wherein using the approximation comprises selecting a sequence of speech units based on the speech unit transition probabilities.

23. The method of claim 22 wherein using the approximation comprises applying a duration constraint to the speech units and selecting a best sequence of speech units based on the duration constraint and the speech unit transition probabilities.

24. The method of claim 14 wherein adjusting the parameters that define the hidden parameter probabilities comprises adjusting the parameters based on parameters of the switching state space model to produce adjusted parameters.

25. The method of claim 24 wherein the input values are generated from a training signal and wherein adjusting the parameters further comprises adjusting the parameters of the switching state space model based on adjusted parameters that define the hidden parameter probabilities to form adjusted switching state space model parameters and adjusting the adjusted parameters that define the hidden parameter probabilities based on the adjusted switching state space model parameters.

26. The method of claim 14 further comprising using the approximation of the posterior probability to identify a sequence of hidden parameters for the sequence of frames.

* * * * *